(12) United States Patent
Kang et al.

(10) Patent No.: US 9,799,350 B2
(45) Date of Patent: Oct. 24, 2017

(54) APPARATUS AND METHOD FOR VERIFYING UTTERANCE IN SPEECH RECOGNITION SYSTEM

(71) Applicant: ELECTRONICS AND TELECOMMUNICATIONS RESEARCH INSTITUTE, Daejeon (KR)

(72) Inventors: Jeom Ja Kang, Daejeon (KR); Hwa Jeon Song, Daejeon (KR); Jeon Gue Park, Daejeon (KR); Hoon Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/186,286

(22) Filed: Jun. 17, 2016

(65) Prior Publication Data

US 2017/0200458 A1 Jul. 13, 2017

(30) Foreign Application Priority Data

Jan. 8, 2016 (KR) .................. 10-2016-0002792

(51) Int. Cl.
*G10L 15/00* (2013.01)
*G10L 25/87* (2013.01)
(Continued)

(52) U.S. Cl.
CPC .............. *G10L 25/87* (2013.01); *G10L 15/02* (2013.01); *G10L 15/1815* (2013.01); *G10L 15/197* (2013.01)

(58) Field of Classification Search
USPC .................. 704/231–257, 270–275
See application file for complete search history.

(56) References Cited

U.S. PATENT DOCUMENTS 7,529,665 B2   5/2009   Kim et al.
7,533,019 B1 *  5/2009   Hakkani-Tur ........ G10L 15/065
                                                   704/244
(Continued)

FOREIGN PATENT DOCUMENTS

KR    10-0655491 B1   12/2006
KR    10-1317339 B1   10/2013

*Primary Examiner* — Jesse Pullias

(57) ABSTRACT

An apparatus and method for verifying an utterance based on multi-event detection information in a natural language speech recognition system. The apparatus includes a noise processor configured to process noise of an input speech signal, a feature extractor configured to extract features of speech data obtained through the noise processing, an event detector configured to detect events of the plurality of speech features occurring in the speech data using the noise-processed data and data of the extracted features, a decoder configured to perform speech recognition using a plurality of preset speech recognition models for the extracted feature data, and an utterance verifier configured to calculate confidence measurement values in units of words and sentences using information on the plurality of events detected by the event detector and a preset utterance verification model and perform utterance verification according to the calculated confidence measurement values.

18 Claims, 6 Drawing Sheets

(51) Int. Cl.
*G10L 15/197* (2013.01)
*G10L 15/02* (2006.01)
*G10L 15/18* (2013.01)

(56) References Cited

U.S. PATENT DOCUMENTS

| | | | |
|---|---|---|---|
| 2003/0023437 A1* | 1/2003 | Fung | G10L 15/1815 704/236 |
| 2005/0055209 A1* | 3/2005 | Epstein | G10L 15/1815 704/255 |
| 2010/0161334 A1* | 6/2010 | Kang | G10L 15/187 704/251 |
| 2011/0153654 A1 | 6/2011 | Lee | |
| 2015/0324456 A1 | 11/2015 | Kim et al. | |

* cited by examiner

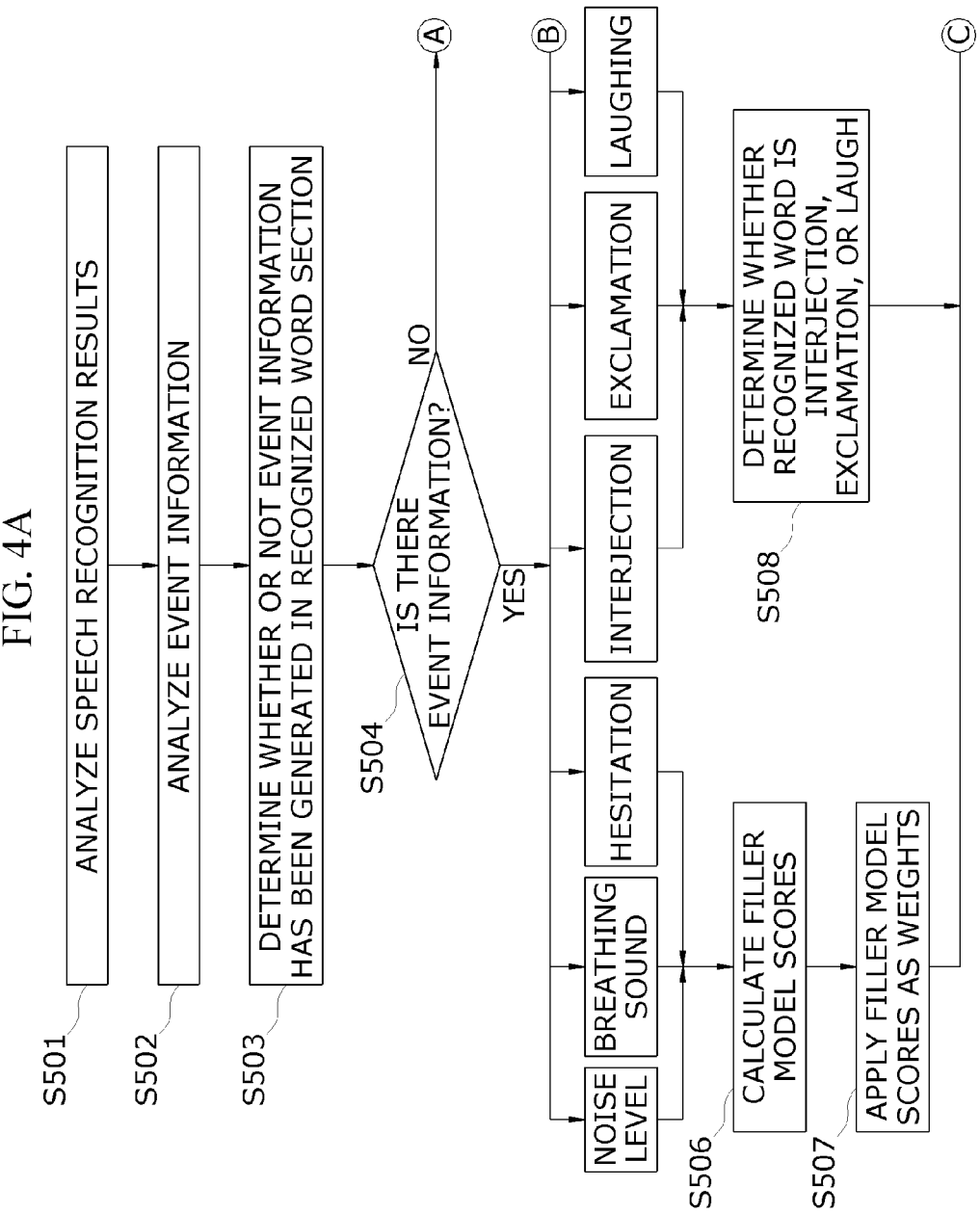

APPARATUS AND METHOD FOR VERIFYING UTTERANCE IN SPEECH RECOGNITION SYSTEM

CROSS-REFERENCE TO RELATED APPLICATION

This application claims priority to and the benefit of Korean Patent Application No. 10-2016-0002792, filed on Jan. 8, 2016, the disclosure of which is incorporated herein by reference in its entirety.

BACKGROUND

1. Field of the Invention

The present invention relates to an apparatus and method for verifying an utterance in a speech recognition system, and more particularly, to an apparatus and method for verifying an utterance based on multi-event detection information in a natural language speech recognition system.

2. Discussion of Related Art

In general, a speech recognition system has a probability of incorrectly recognizing an utterance, and thus an utterance verification process of determining whether to accept or reject a speech recognition result is performed.

Such a technique of determining whether a speech recognition result is correct or incorrect in order to improve the reliability of speech recognition of a speech recognition system is referred to as "utterance verification."

An existing utterance verification system performs utterance verification based on a speech recognition result of a decoder or through first-stage utterance verification based on the recognition result of the decoder and second-stage utterance verification based on information generated by other elements constituting a recognition engine, that is, a noise processing module and a feature extraction module.

Such utterance verification involves extraction of general information from a speech recognition system and thus cannot reflect characteristics for natural language speech recognition.

From an experiment of such a natural-language utterance recognition, it is possible to know that misrecognitions occur in sections of a structure pronunciation, an interjection, sound stretching, and so on.

SUMMARY OF THE INVENTION

The present invention is directed to providing an apparatus and method for verifying an utterance based on multi-event detection information in a natural language speech recognition system.

Objects of the present invention are not limited to that mentioned above, and other objects will be apparent to those of ordinary skill in the art from the description below.

According to an aspect of the present invention, there is provided an apparatus for verifying an utterance in a speech recognition system, the apparatus including: a noise processor configured to process noise of an input speech signal; a feature extractor configured to extract features of speech data obtained through the noise processing; an event detector configured to detect events of the plurality of speech features occurring in the speech data using the noise-processed data and data of the extracted features; a decoder configured to perform speech recognition using a plurality of preset speech recognition models for the extracted feature data; and an utterance verifier configured to calculate confidence measurement values in units of words and sentences using information on the plurality of events detected by the event detector and a preset utterance verification model, and perform utterance verification according to the calculated confidence measurement values.

The event detector may include a detector configured to detect at least one feature among a noise level, a breathing sound, an interjection, a repetition of a phrase, hesitation, an exclamation, sound stretching, laughing, utterance speed, and an incorrect pronunciation from the noise-processed data and the extracted feature data.

The speech recognition models may include a context-dependent acoustic model and an n-gram language model.

The utterance verification model may include a smoothing anti-model, a specific anti-model, a filler model, and a support vector machine (SVM) model.

The utterance verification model may include: a word-level utterance verifier configured to separately calculate word-specific confidence scores of words of sections in which the events have occurred and words for which no event has occurred; a sentence-level utterance verifier configured to calculate confidence scores in units of sentences or utterance based on the word-specific confidence scores calculated by the word-level utterance verifier; a sentence-level event application utterance verifier configured to calculate sentence-specific confidence scores to which the events are applied without separating words from each other using section information of the sections in which the events have occurred and estimated values of a plurality of feature parameters; a sentence structure and meaning analyzer configured to analyze sentence structures and meanings of speech recognition result sentences which are decoding results of the decoder and calculate confidence scores of sentences; and a decision maker configured to compare the scores calculated by the sentence-level utterance verifier, the scores calculated by the sentence-level event application utterance verifier, and the scores calculated by the sentence structure and meaning analyzer with a preset threshold value and determine whether or not to accept the speech recognition result sentences according to the comparison results.

The word-level utterance verifier may calculate the word-specific confidence scores using the specific anti-model and the filler model preset in a database.

The sentence-level event application utterance verifier may calculate the sentence-specific confidence scores of the sentences using the SVM model, which is preset in a database and trained by an SVM with training data reflecting a feature of a natural language.

The feature parameters of the sentence-level event application utterance verifier may include at least one parameter among a noise estimation section and estimation value, a breathing sound section and estimation value, an interjection section and estimation value, a phrase repetition section and estimation value, a hesitation section and estimation value, an exclamation section and estimation value, sound stretching section and estimation value, a laughing section and estimation value, an utterance speed section and estimation value, and an incorrect pronunciation section and estimation value, a number of frames in which no event has been detected, and a logarithm-ratio likelihood value.

The sentence structure and meaning analyzer may analyze the sentence structures and meanings of the speech recognition result sentences using a morpheme analyzer.

The decision maker may accept the speech recognition result sentences when two or more kinds of scores among the scores calculated by the sentence-level utterance verifier, the scores calculated by the sentence-level event application utterance verifier, and the scores calculated by the sentence structure and meaning analyzer are larger than the preset threshold value, may reject the speech recognition result sentences when all of the three kinds of scores are smaller than the preset threshold value, and may determine that the speech recognition result sentences are indeterminable when one kind of scores among the three kinds of scores are larger than the preset threshold value and the other two kinds of scores are smaller than the preset threshold value.

According to another aspect of the present invention, there is provided a method of verifying an utterance in a speech recognition system, the method including: processing noise of an input speech signal; extracting features of speech data obtained through the noise processing; detecting events of the plurality of speech features occurring in the speech data using the noise-processed data and data of the extracted features; performing speech recognition using a plurality of preset speech recognition models for the extracted feature data; and calculating confidence measurement values in units of words and sentences using information on the plurality of detected events and a preset utterance verification model, and performing utterance verification according to the calculated confidence measurement values.

The events may include at least one of a noise level, a breathing sound, an interjection, a repetition of a phrase, hesitation, an exclamation, sound stretching, a laughing, utterance speed, and an incorrect pronunciation in the noise-processed data and the extracted feature data.

The speech recognition models may include a context-dependent acoustic model and an n-gram language model.

The utterance verification model may include a smoothing anti-model, a specific anti-model, a filler model, and an SVM model.

The performing of the utterance verification may include: separately calculating word-specific confidence scores of words of sections in which the events have occurred and words for which no event has occurred; calculating confidence scores in units of sentences or utterance based on the calculated word-specific confidence scores; calculating sentence-specific confidence scores to which the events are applied without separating words from each other using section information of the sections in which the events have occurred and estimated values of a plurality of feature parameters; analyzing sentence structures and meanings of speech recognition result sentences and calculating confidence scores of sentences; and comparing the calculated confidence scores with a preset threshold value and determining whether or not to accept the speech recognition result sentences according to the comparison results.

The calculating of the word-specific confidence scores may include calculating the word-specific confidence scores using the specific anti-model and the filler model preset in a database.

The calculating of the confidence scores in units of sentences or utterances may include calculating the confidence scores of the sentences using the SVM model, which is preset in a database and trained by an SVM with training data reflecting a feature of a natural language.

The feature parameters may include at least one parameter among a noise estimation section and estimation value, a breathing sound section and estimation value, an interjection section and estimation value, a phrase repetition section and estimation value, a hesitation section and estimation value, an exclamation section and estimation value, a sound stretching section and estimation value, a laughing section and estimation value, an utterance speed section and estimation value, and an incorrect pronunciation section and estimation value, a number of frames in which no event has been detected, and a logarithm-ratio likelihood value.

The analyzing of the sentence structures and meanings and the calculating of the confidence scores of the sentences may include analyzing the sentence structures and meanings of the speech recognition result sentences using a morpheme analyzer.

The determining of whether or not to accept the speech recognition result sentences may include accepting the speech recognition result sentences when two or more kinds of scores among the three kinds of calculated scores are larger than the preset threshold value, rejecting the speech recognition result sentences when all of the three kinds of scores are smaller than the preset threshold value, and determining that the speech recognition result sentences are indeterminable when one kind of scores among the three kinds of scores are larger than the preset threshold value and the other two kinds of scores are smaller than the preset threshold value.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for a complete disclosure of the present invention and to fully convey the scope of the invention to those of ordinary skill in the art to which the present invention pertains. The present invention is defined only by the scope of the claims. Meanwhile, the terminology used herein is for the purpose of describing the embodiments and is not intended to be limiting of the invention. As used in this specification, the singular form of a word includes the plural unless the context clearly indicates otherwise. The term "comprise" and/or "comprising," when used herein, does not preclude the presence or addition of one or more components, steps, operations, and/or elements other than stated components, steps, operations, and/or elements.

Hereinafter, an apparatus and method for verifying an utterance in a speech recognition system according to exemplary embodiments of the present invention will be described in detail with reference to the accompanying drawings.

Figure 1:
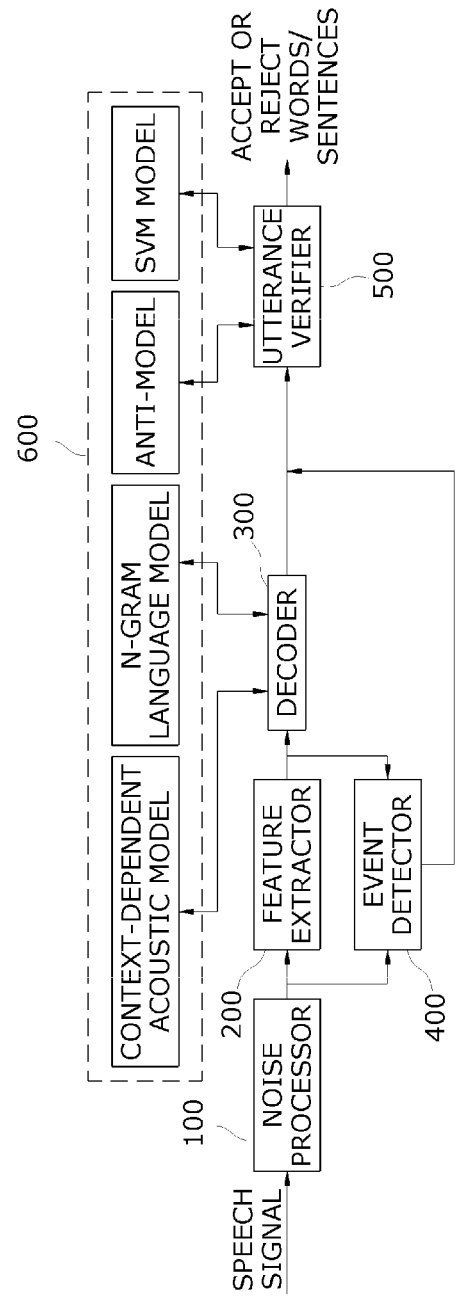
FIG. 1 is an overall block diagram of a speech recognition system according to an exemplary embodiment of the present invention.

FIG. 1 is an overall block diagram of a speech recognition system according to an exemplary embodiment of the present invention.

As shown in FIG. 1, a speech recognition system according to an exemplary embodiment of the present invention may include a noise processor 100, a feature extractor 200, a decoder 300, an event detector 400, an utterance verifier 500, and a database 600. The database 600 may store a context-dependent acoustic model, an n-gram language model, anti-models, and support vector machine (SVM) models.

The noise processor 100 determines whether or not there is noise in an input speech signal, performs noise removal processing when there is noise, and provides the noise-processed speech signal to the feature extractor 200 and the event detector 400.

The feature extractor 200 extracts feature data of the noise-processed speech signal and provides the feature data to the event detector 400 and the decoder 300.

The decoder 300 performs speech recognition using the feature data provided by the feature extractor 200 and the context-dependent acoustic model and the n-gram language model of the database 600 and provides speech recognition results to the utterance verifier 500.

The event detector 400 detects each event representing a natural language feature using data whose noise has been processed by the noise processor 100 and the feature data extracted by the feature extractor 200 and provides detection results to the utterance verifier 500.

Also, the event detector 400 may store event types, frame start points, frame end points, scores, etc. with regard to the event detection results. Here, the events may be defined as a noise level, a breathing sound, an interjection, a repetition of a phrase, a hesitation, an exclamation, sound stretching, laughing, speech rate, and an incorrect pronunciation.

The utterance verifier 500 calculates word-specific or sentence specific confidence measurement values using the multi-event information provided by the event detector 400, an anti-model which has been trained and stored in advance, and an SVM model, compares the calculated confidence measurement values with a preset threshold value, and accepts or rejects the speech recognition results in units of words or sentences.

The aforementioned event detector 400 and utterance verifier 500 will be described in further detail below with reference to FIGS. 3 and 4.

Figure 2:
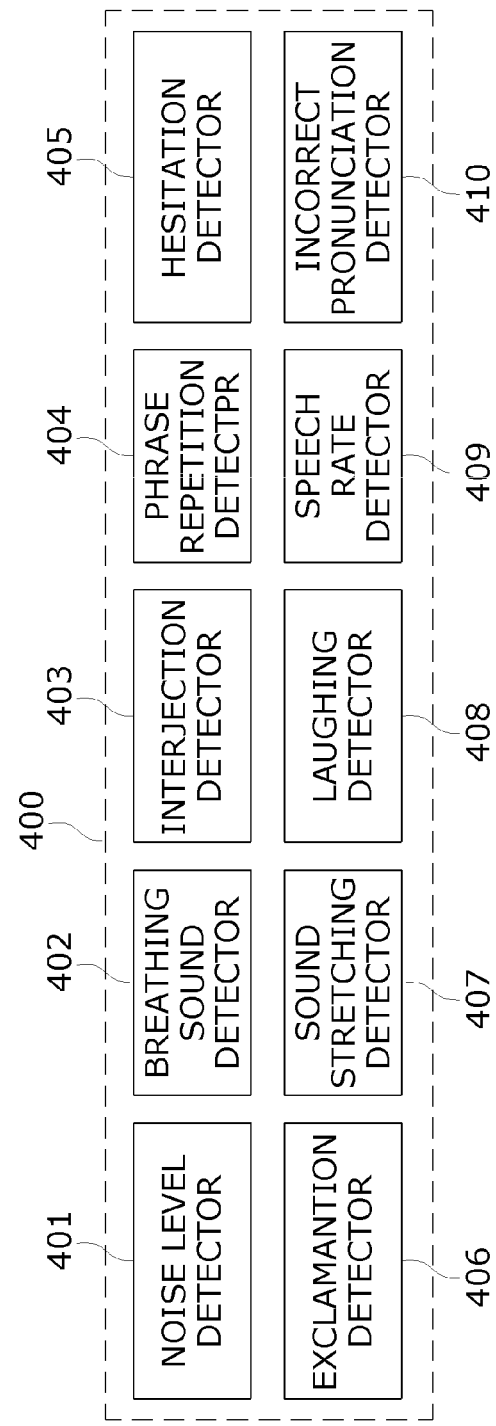
FIG. 2 is a diagram showing a detailed constitution of an event detector shown in FIG. 1.
Figure 3:
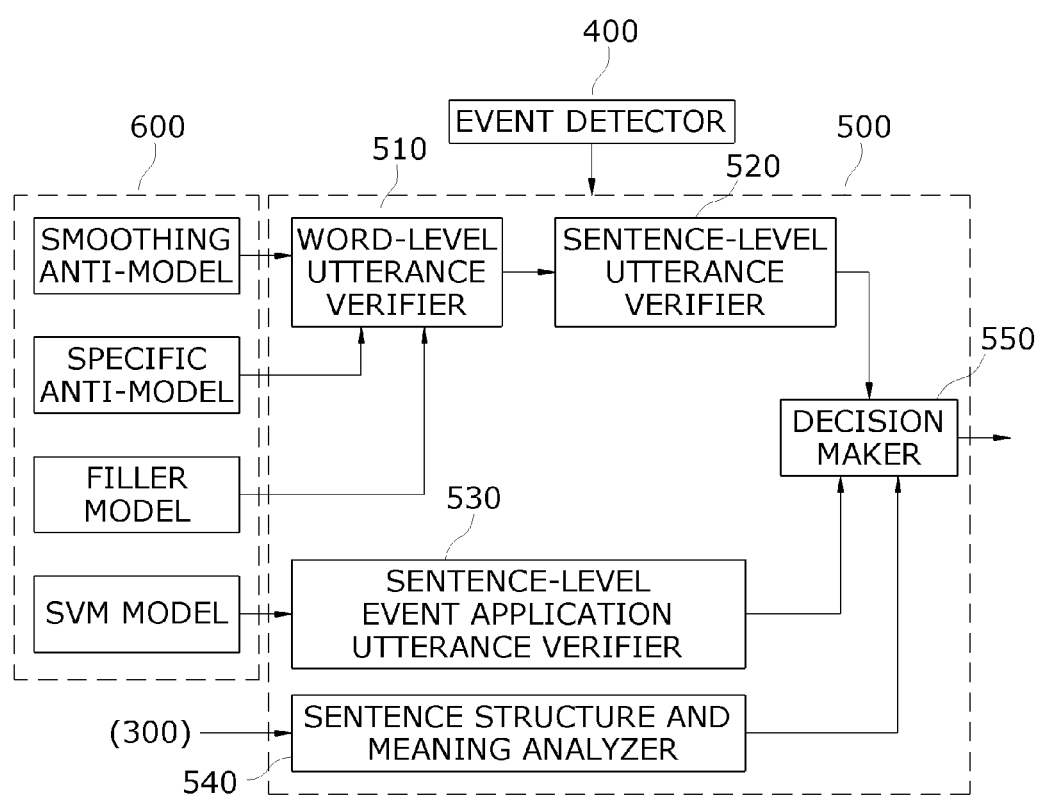
FIG. 3 is a detailed block diagram of an utterance verifier shown in FIG. 1; and FIG. 4A

FIG. 2 is a diagram showing a detailed constitution of the event detector 400 shown in FIG. 1, and FIG. 3 is a detailed block diagram of the utterance verifier 500 shown in FIG. 1.

As shown in FIG. 2, the event detector 400 may include detectors 401 to 410 which respectively detect a noise level, a breathing sound, an interjection, a repetition of a phrase, hesitation, an exclamation, sound stretching, laughing, uttering speed, and an incorrect pronunciation from the data whose noise has been processed by the noise processor 100 shown in FIG. 1 and the feature data detected by the feature extractor 200.

In other words, the event detector 400 detects multi-event information used for utterance verification. When a speech signal is input, the event detector 400 detects events using noise-processed data or feature-extracted data, stores event types, frame start points, frame end points, and scores, and provides information on the detected events to the utterance verifier 500 so that the event information can be used for utterance verification.

Meanwhile, the utterance verifier 500 may include a word-level utterance verifier 510, a sentence-level utterance verifier 520, a sentence-level event application utterance verifier 530, a sentence structure and meaning analyzer 540, and a decision maker 550 as shown in FIG. 3.

The utterance verifier 500 verifies an utterance by applying information on detected events in units of sentences and verifies the utterance to which the events are applied in units of words with regard to words of sections in which the events have occurred.

Also, the utterance verifier 500 performs utterance verification for words for which no event has occurred in units of words without applying the events and performs utterance verification in units of sentences based on the word-level utterance verification.

More specifically, the word-level utterance verifier 510 performs an utterance verification for words of sections in which events have occurred differently compared to words for which no event has occurred. In other words, an utterance verification to which word-level events are applied for words of sections in which events have occurred involves calculating word-specific confidence scores using specific anti-models and filler models of the database 600.

Also, for an utterance verification to which word-level events are not applied, the word-level utterance verifier 510 calculates word-level confidence scores by applying a smoothing anti-model of the database 600.

The sentence-level utterance verifier 520 verifies the utterance in units of sentences or utterances with regard to the word-level confidence scores calculated by the word-level utterance verifier 510.

For the corresponding sentences, the sentence-level event application utterance verifier 530 generates in advance SVM models of the database 600 trained by an SVM with training data reflecting a feature of a natural language. In this case, words are not separated from each other, and section information of sections in which events have occurred and estimated values are used as parameters. As for the event estimation values, values estimated by the event detector 400 are used, and 22 feature parameters are used as shown in Table 1 below.

TABLE 1

| Number | Feature |
| --- | --- |
| 1 | Noise estimation section and estimated value |
| 2 | Breathing sound section and estimated value |
| 3 | Interjection section and estimated value |
| 4 | Phrase repetition section and estimated value |
| 5 | Hesitation section and estimated value |
| 6 | Exclamation section and estimated value |
| 7 | Sound stretching section and estimated value |
| 8 | Laughing section and estimated value |
| 9 | Speech rate section and estimated value |
| 10 | Incorrect pronunciation section and estimated value |
| 11 | Number of frames in which no event has been detected and logarithm-ratio likelihood value |

For speech recognition result sentences which are decoding results of the decoder 300 shown in FIG. 1, the sentence structure and meaning analyzer 540 uses a morpheme analyzer (not shown) to analyze sentence structures and meanings and calculates confidence scores for the sentences.

The decision maker 550 compares sentence-level event application sentence confidence scores calculated by the sentence-level event application utterance verifier 530, sentence-level confidence scores calculated by the sentence-level utterance verifier 520 and to which events have been applied in units of words, and the sentence structure analysis confidence scores calculated by the sentence structure and meaning analyzer 540 with a preset threshold value and determines whether to accept or reject the speech recognition results of sentences according to the comparison results.

In other words, the decision maker 550 accepts speech recognition results of the corresponding sentences when two or more kinds of scores among the sentence-level event application sentence confidence scores calculated by the sentence-level event application utterance verifier 530, the sentence-level confidence scores calculated by the sentence-level utterance verifier 520 and to which events have been applied in units of words, and the sentence structure analysis confidence scores calculated by the sentence structure and meaning analyzer 540 are larger than the preset threshold value and rejects the recognition results of the sentences when all of the three kinds of scores are smaller than the preset threshold value. When one kind of scores among the three kinds of scores are larger than the preset threshold value and the other two kinds of scores are smaller than the preset threshold value, the decision maker 550 determines that the corresponding sentences in the speech recognition results are indeterminable.

Detailed operations of the word-level utterance verifier 510 in the utterance verifier 500 shown in FIG. 3 will be described below with reference to FIG. 4A and FIG. 4B.

Figure 4B:
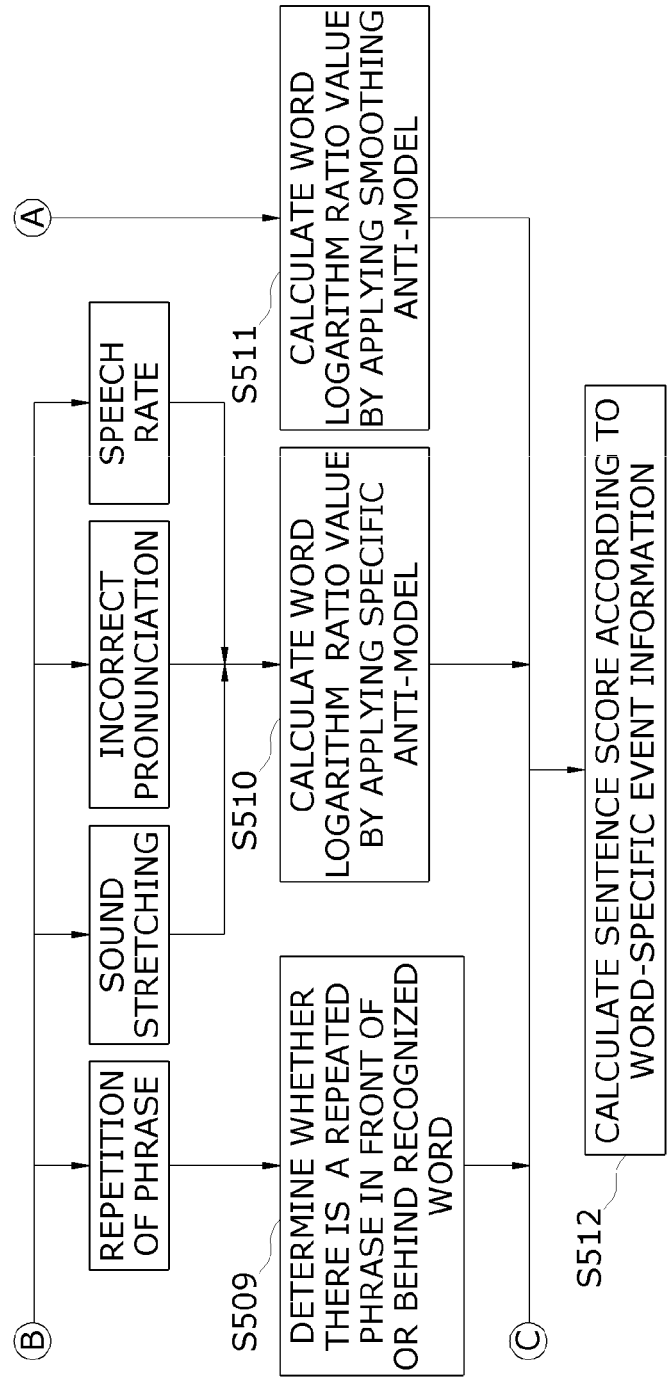
FIG. 4B is a flowchart illustrating detailed operations of a word-level utterance verifier shown in FIG. 3.

FIG. 4A and FIG. 4B is a flowchart illustrating detailed operations of a word-level utterance verifier and a sentence-level utterance verifier shown in FIG. 3.

First, utterance verification in which events are applied in units of words is performed for words of event occurrence sections resulting from event detection, and utterance verification in which events are not applied in units of words is performed for words for which no event has occurred.

Then, the sentence-level utterance verifier 520 performs a sentence-level utterance verification based on results of the word-level utterance verification in which events have been applied and the word-level utterance verification in which events have not been applied.

More specifically, first, the word-level utterance verifier 510 analyzes speech recognition results output from the searcher 300 shown in FIG. 1 (S501).

Then, the word-level utterance verifier 510 analyzes event detection information provided by the event detector 400, thereby determining whether or not event information has been generated in a recognized word section (S502 to S504).

When it is determined that there is event information, filler model scores are calculated for a noise level, a breathing sound, and a hesitation event in the event information and applied to a smoothing anti-model logarithm ratio value as weights of word confidence values (S506 and S507). At this time, when there are several events in a frame in the corresponding word section, a logarithmic ratio value of frame units is weighted to increase a score of an anti-model, and thus it is emphasized that there is a high probability of misrecognition of the word section.

When an event having occurred is an interjection, an exclamation, or laughing, it is determined whether a recognized word corresponds to an interjection, an exclamation, or laughing.

When it is determined that the recognized word is an interjection, an exclamation, or laughing, an anti-model score becomes 1, otherwise, the anti-model score becomes 2. Then, the score is applied as a weight for a word confidence value (S508).

Meanwhile, when an event having occurred is a repetition of a phrase, it is determined whether there is a repeated phrase in front of or behind the recognized word (S509).

When an event having occurred is sound stretching, an incorrect pronunciation, or speed rate, a specific anti-model is applied to calculate a word logarithm likelihood ratio, and a smoothing anti-model logarithm ratio value is weighted with the calculated word logarithm likelihood ratio to calculate a logarithmic ratio value (S510).

When a word has no event information, a smoothing anti-model is applied to the word to calculate a word logarithm likelihood ratio value (S511).

In this way, a basic smoothing anti-model logarithm likelihood value is weighted with values calculated according to event sections when each word recognized in a sentence or an utterance level has event information, and a basic smoothing anti-model is applied to a word section having no event information. Then, scores of all sentences or utterance units are calculated (S512).

An embodiment of the present invention may be implemented in a computer system, e.g., as a computer readable medium.

Figure 5:
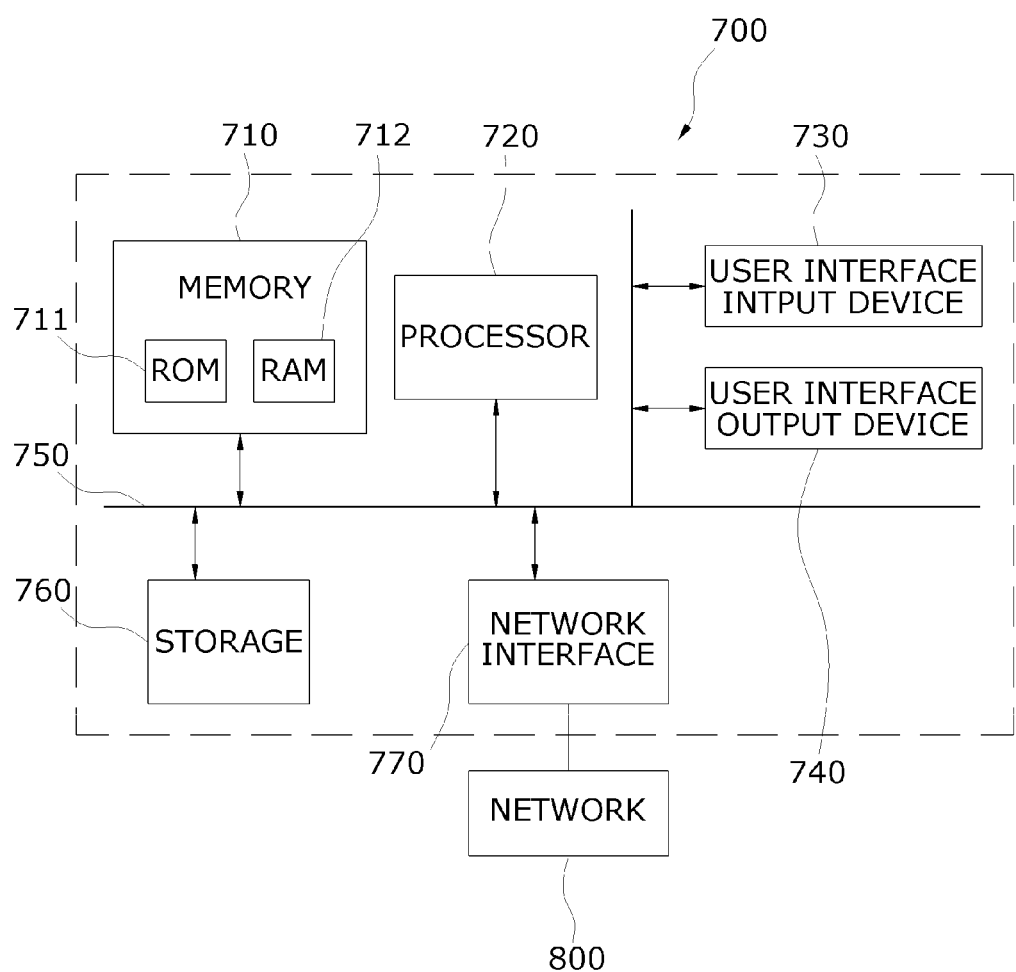
FIG. 5 is a block diagram illustrating a computer system to which the present invention is applied.

FIG. 5 is a block diagram illustrating a computer system to which the present invention is applied.

As shown in FIG. 5, a computer system 700 may include one or more of a processor 710, a memory 730, a user input device 740, a user output device 750, and a storage 760, each of which communicates through a bus 720. The computer system 700 may also include a network interface 770 that is coupled to a network 800. The processor 710 may be a central processing unit (CPU) or a semiconductor device that executes processing instruction stored in the memory 730 and/or the storage 760. The memory 730 and the storage 760 may include various forms of volatile or non-volatile storage media. For example, the memory 730 may include a read-only memory (ROM) 731 and a random access memory (RAM) 732.

Accordingly, an embodiment of the invention may be implemented as a computer implemented method or as a non-transitory computer readable medium with computer executable instruction stored thereon. In an embodiment, when executed by the processor, the computer readable instruction may perform a method according to at least one aspect of the invention.

The present invention proposes a structure and method for defining events occurring as natural language phenomena and integrally using in utterance verification multi-event information extracted from event detectors for the defined respective events and thus can improve the performance of utterance verification.

In other words, events having ill-formed utterance features shown in usual conversations or a colloquial style, including an interjection, a repetition of a phrase, hesitation, an exclamation, insertion of an idiomatic word, a correction, an inversion, sound stretching, laughing, an incorrect pronunciation, utterance speed, etc., occur in natural languages. Therefore, the present invention detects events having such features and integrally uses information on the detected events in an utterance verification device, thereby improving the performance of utterance verification.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for verifying an utterance in a speech recognition system, the apparatus comprising:

a noise processor configured to process noise of an input speech signal;

a feature extractor configured to extract features of speech data obtained through the noise processing;

an event detector configured to detect events of the plurality of speech features occurring in the speech data using the noise-processed data and data of the extracted features;

a decoder configured to perform speech recognition using a plurality of preset speech recognition models for the extracted feature data; and an utterance verifier configured to calculate confidence measurement values in units of words and sentences using information on the plurality of events detected by the event detector and a preset utterance verification model, and perform utterance verification according to the calculated confidence measurement values, wherein the utterance verification model includes a smoothing anti-model, a specific anti-model, a filler model, and a support vector machine (SVM) model.

2. The apparatus of claim 1, wherein the event detector includes a detector configured to detect at least one feature among a noise level, a breathing sound, an interjection, a repetition of a phrase, hesitation, an exclamation, sound stretching, laughing, speech rate, and an incorrect pronunciation from the noise-processed data and the extracted feature data.

3. The apparatus of claim 1, wherein the speech recognition models include a context-dependent acoustic model and an n-gram language model.

4. The apparatus of claim 1, wherein the utterance verification model further includes:

a word-level utterance verifier configured to separately calculate word-specific confidence scores of words of sections in which the events have occurred and words for which no event has occurred;

a sentence-level utterance verifier configured to calculate confidence scores in units of sentences or utterance based on the word-specific confidence scores calculated by the word-level utterance verifier;

a sentence-level event application utterance verifier configured to calculate sentence-specific confidence scores to which the events are applied without separating words from each other using section information of the sections in which the events have occurred and estimated values of a plurality of feature parameters;

a sentence structure and meaning analyzer configured to analyze sentence structures and meanings of speech recognition result sentences which are search results of the decoder, and calculate confidence scores of sentences; and a decision maker configured to compare the scores calculated by the sentence-level utterance verifier, the scores calculated by the sentence-level event application utterance verifier, and the scores calculated by the sentence structure and meaning analyzer with a preset threshold value and determine whether or not to accept the speech recognition result sentences according to comparison results.

5. The apparatus of claim 4, wherein the word-level utterance verifier calculates the word-specific confidence scores using the specific anti-model and the filler model preset in a database.

6. The apparatus of claim 4, wherein the sentence-level event application utterance verifier calculates the confidence scores of the sentences using the SVM model, which has been preset in a database and trained by an SVM with training data reflecting a feature of a natural language.

7. The apparatus of claim 4, wherein the feature parameters of the sentence-level event application utterance verifier include at least one parameter among a noise estimation section and estimation value, a breathing sound section and estimation value, an interjection section and estimation value, a phrase repetition section and estimation value, a hesitation section and estimation value, an exclamation section and estimation value, a sound stretching section and estimation value, a laughing section and estimation value, a speech rate section and estimation value, and an incorrect pronunciation section and estimation value, a number of frames in which no event has been detected, and a logarithm-ratio likelihood value.

8. The apparatus of claim 4, wherein the sentence structure and meaning analyzer analyzes the sentence structures and meanings of the speech recognition result sentences using a morpheme analyzer.

9. The apparatus of claim 4, wherein, when two or more kinds of scores among the scores calculated by the sentence-level utterance verifier, the scores calculated by the sentence-level event application utterance verifier, and the scores calculated by the sentence structure and meaning analyzer are larger than the preset threshold value, the decision maker accepts the speech recognition result sentences, when all of the three kinds of scores are smaller than the preset threshold value, the decision maker rejects the speech recognition result sentences, and when one kind of scores among the three kinds of scores is larger than the preset threshold value and the other two kinds of scores are smaller than the preset threshold value, the decision maker determines that the speech recognition result sentences are indeterminable.

10. A method of verifying an utterance in a speech recognition system, the method comprising:

processing noise of an input speech signal;

extracting features of speech data obtained through the noise processing;

detecting events of the plurality of speech features occurring in the speech data using the noise-processed data and data of the extracted features;

performing speech recognition using a plurality of preset speech recognition models for the extracted feature data; and calculating confidence measurement values in units of words and sentences using information on the plurality of detected events and a preset utterance verification model, and performing utterance verification according to the calculated confidence measurement values, wherein the utterance verification model includes a smoothing anti-model, a specific anti-model, a filler model, and a support vector machine (SVM) model.

11. The method of claim 10, wherein the events include at least one of a noise level, a breathing sound, an interjection, a repetition of a phrase, hesitation, an exclamation, sound stretching, laughing, utterance speed, and an incorrect pronunciation in the noise-processed data and the extracted feature data.

12. The method of claim 10, wherein the speech recognition models include a context-dependent acoustic model and an n-gram language model.

13. The method of claim 10, wherein the performing of the utterance verification includes:

separately calculating word-specific confidence scores of words of sections in which the events have occurred and words for which no event has occurred;

calculating confidence scores in units of sentences or utterances based on the calculated word-specific confidence scores;

calculating sentence-specific confidence scores to which the events are applied without separating words from each other using section information of the sections in which the events have occurred and estimated values of a plurality of feature parameters;

analyzing sentence structures and meanings of speech recognition result sentences and calculating confidence scores of sentences; and comparing the calculated confidence scores with a preset threshold value and determining whether or not to accept the speech recognition result sentences according to comparison results.

14. The method of claim 13, wherein the calculating of the word-Specific confidence scores includes calculating the word-specific confidence scores using the specific anti-model and the filler model preset in a database.

15. The method of claim 13, wherein the calculating of the confidence scores in units of sentences or utterances includes calculating the confidence scores of the sentences using the SVM model, which has been preset in a database and trained by an SVM with training data reflecting a feature of a natural language.

16. The method of claim 13, wherein the feature parameters include at least one parameter among a noise estimation section and estimation value, a breathing sound section and estimation value, an interjection section and estimation value, a phrase repetition section and estimation value, a hesitation section and estimation value, an exclamation section and estimation value, a sound stretching section and estimation value, a laughing section and estimation value, a speech rate section and estimation value, and an incorrect pronunciation section and estimation value, a number of frames in which no event has been detected, and a logarithm-ratio likelihood value.

17. The method of claim 13, wherein the analyzing of the sentence structures and meanings and the calculating of the confidence scores of the sentences include analyzing the sentence structures and meanings of the speech recognition result sentences using a morpheme analyzer.

18. The method of claim 13, wherein the determining of whether or not to accept the speech recognition result sentences includes accepting the speech recognition result sentences when two or more kinds of scores among the three kinds of calculated scores are larger than the preset threshold value, rejecting the speech recognition result sentences when all of the three kinds of scores are smaller than the preset threshold value, and determining that the speech recognition result sentences are indeterminable when one kind of scores among the three kinds of scores is larger than the preset threshold value and the other two kinds of scores are smaller than the preset threshold value.

* * * * *